United States Patent [19]

Russell

[11] Patent Number: 4,708,403

[45] Date of Patent: Nov. 24, 1987

[54] INTERMITTENT VEHICULAR BRAKING APPARATUS AND METHOD

[76] Inventor: Carl D. Russell, Box 334, Sallisaw, Okla. 74955

[21] Appl. No.: 893,666

[22] Filed: Aug. 6, 1986

[51] Int. Cl.$^4$ .................. B60T 15/58; B60T 15/02; G05D 7/01; F17D 3/01

[52] U.S. Cl. ........................................ 303/61; 303/68; 137/627.5; 137/102

[58] Field of Search .............. 303/68, 61, 56, 55, 303/54, 50, 51, 52, 53, 28; 137/102, 627.5

[56] References Cited

U.S. PATENT DOCUMENTS 4,037,883  7/1977  Fuchs ............................. 303/61 X
4,085,768  4/1978  Norr ................................. 137/102

FOREIGN PATENT DOCUMENTS 0820751  8/1969  Canada ............................. 303/61

Primary Examiner—Andres Kashnikow
Assistant Examiner—Richard Potosnak

[57] ABSTRACT

An auxiliary manual and physically controlled fluid pressure handling apparatus for vehicular pneumatic systems induced into the braking system to become a tool to aid the operator in providing rapid OFF-and-ON impulse or conventional braking, the selection of which is dependent upon the amount of force applied by the operator against the brake pedal, which also controls the frequency of intermittent application of the brakes by the apparatus.

9 Claims, 3 Drawing Figures

INTERMITTENT VEHICULAR BRAKING APPARATUS AND METHOD

FIELD OF THE INVENTION

The invention relates, in general, to a unique valving arrangement, and more particularly, to an anti-skid vehicular air braking system, wherein the brakes are selectively applied and released several times per second under control of pedal governed air pressure without any electrical or electronic circuitry.

BACKGROUND OF THE INVENTION AND PRIOR ART

Presently, certain of the more expensive makes of automobiles are being sold with intermittent braking provisions, but, these are electrically controlled haudraulic braking systems. In general, heavier vehicles such as trucks and the larger or heavy-duty pickups using the computer controlled intermittent air brakes requiring complex independent control of the application and release of brake shoes at each wheel are not economically successful. However, my U.S. Pat. No. 4,538,859 issued Sept. 3, 1985, is an On/Off Air Braking System which interrupts the trucks main high pressure line under electrical valving control and thereby avoids the complexities of independent wheel monitoring.

BRIEF SUMMARY OF THE PRESENT INVENTION

The present invention avoids all electrical/electronic controls, but provides on/off control by virtue of a shuttle piston, mounted for reciprocating movement, and carrying a shuttle exhaust valve for actuating a main high pressure line, resiliently biased, valve in a forward direction caused by line air pressure at the rear end of the piston to open the line air brakes and close the exhaust from the brakes.

The emitted high pressure drives the piston and exhaust valve in the opposite direction. This is true because the forward end of the piston adjacent main valve is larger than the remote end of the piston, and the force is greater even though the line pressure is the same. During this travel, the exhaust valve stem strikes a plunger to reverse its direction, opens the exhaust valve to exhaust pressure on the large end of the piston and brake actuators and then a spring causes the high pressure valve to close. As soon as the pressure is reduced at the larger end of the piston the pressure from the brake actuators is released through the exhaust passage in the piston.

When the pressure at the large end of the piston decreases to a point to release the brakes, this allows the force at the smaller end of the piston to overcome the force at the larger end. The piston then moves in the forward direction.

BRIEF DESCRIPTION OF THE DRAWINGS

In FIG. 1A, any slight pressure applied to brake pedal 600 opens pressure regulator valve 500 to apply main line pressure over main line 3 to Main Line Valve 35, which applies air pressure over main line 4 to the Brake Actuators 700.

Main Line Valve 35 is opened by Shuttle Piston and Exhaust Valve 90 and 80 because main line air pressure is always applied to Shuttle Piston and Exhaust Valve 90 and 80 over line 2 whenever Brake Pedal 600 is depressed. This causes the Shuttle Piston and Exhaust Valve 90 and 80 to travel in a forward direction to strike Main Line Valve 35 and crack it. Air rushes in from line 3 to rapidly, fully open the Valve 35 and drive the Shuttle Piston and Exhaust Valve 90 and 80 in the rearward direction against the air pressure continuously supplied over line 2 because the end of Shuttle Piston 90 facing the Main Valve 35 is larger than the end receiving air pressure from line 2.

Figure 1:
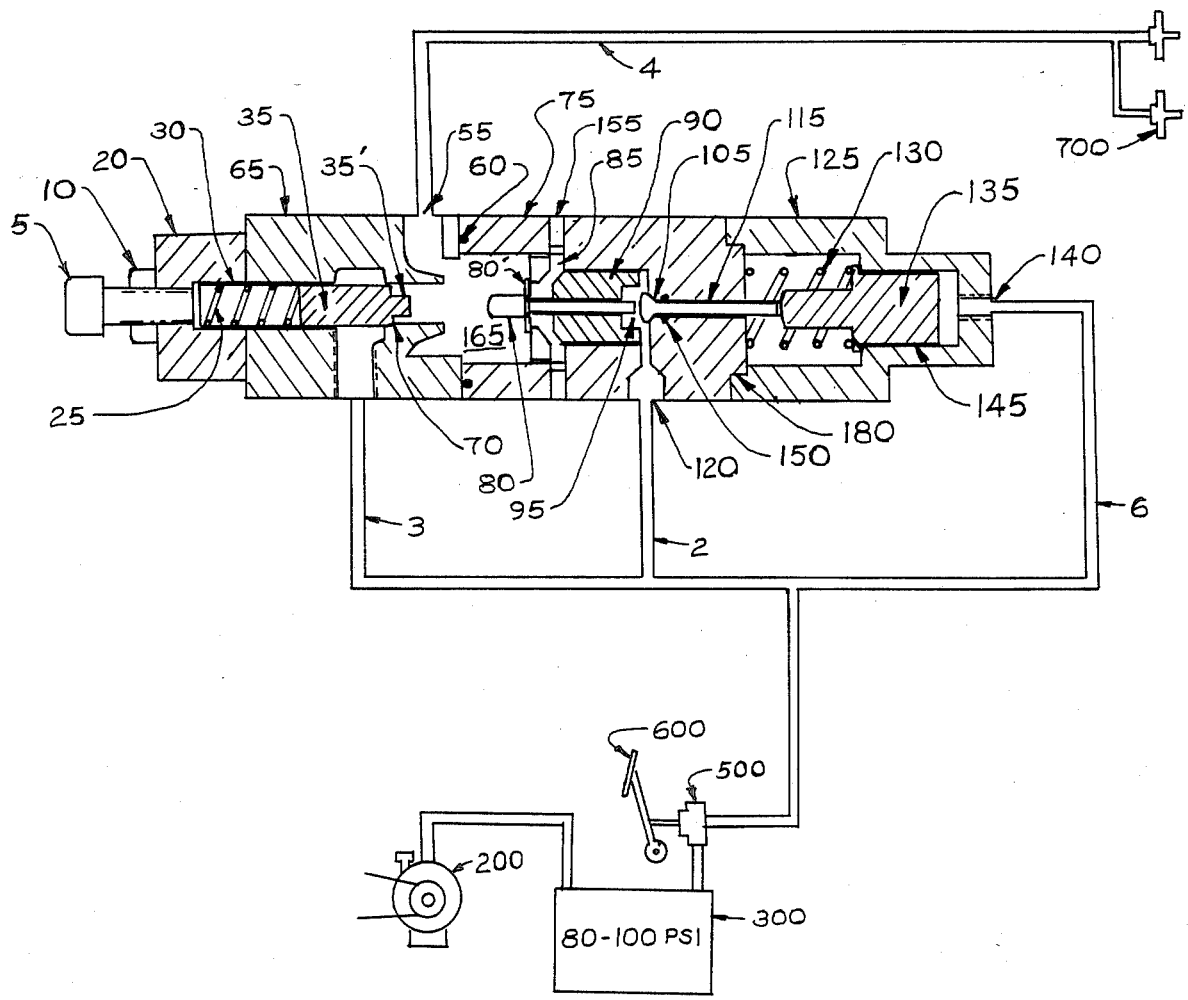
FIG. 1A is a schematic representation to illustrate certain principles of the invention.
Figure 2:
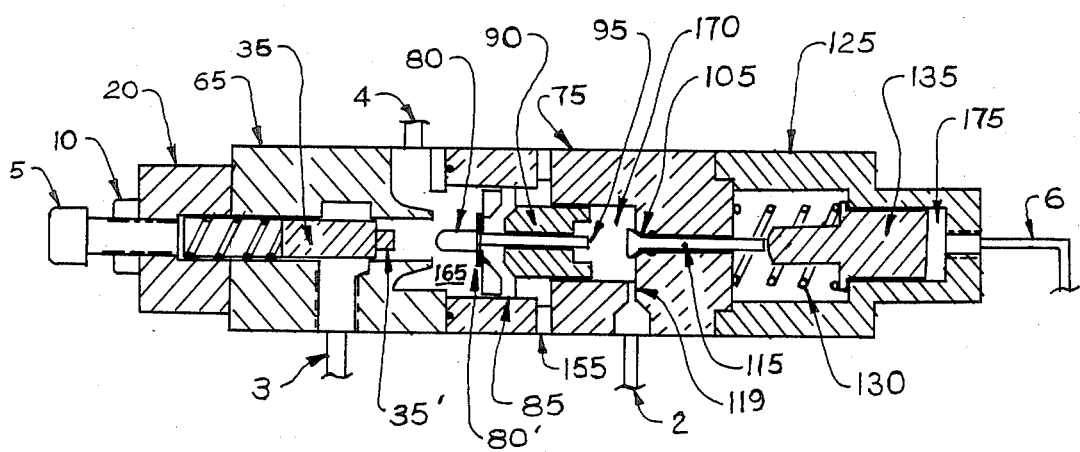
Figure 1A:
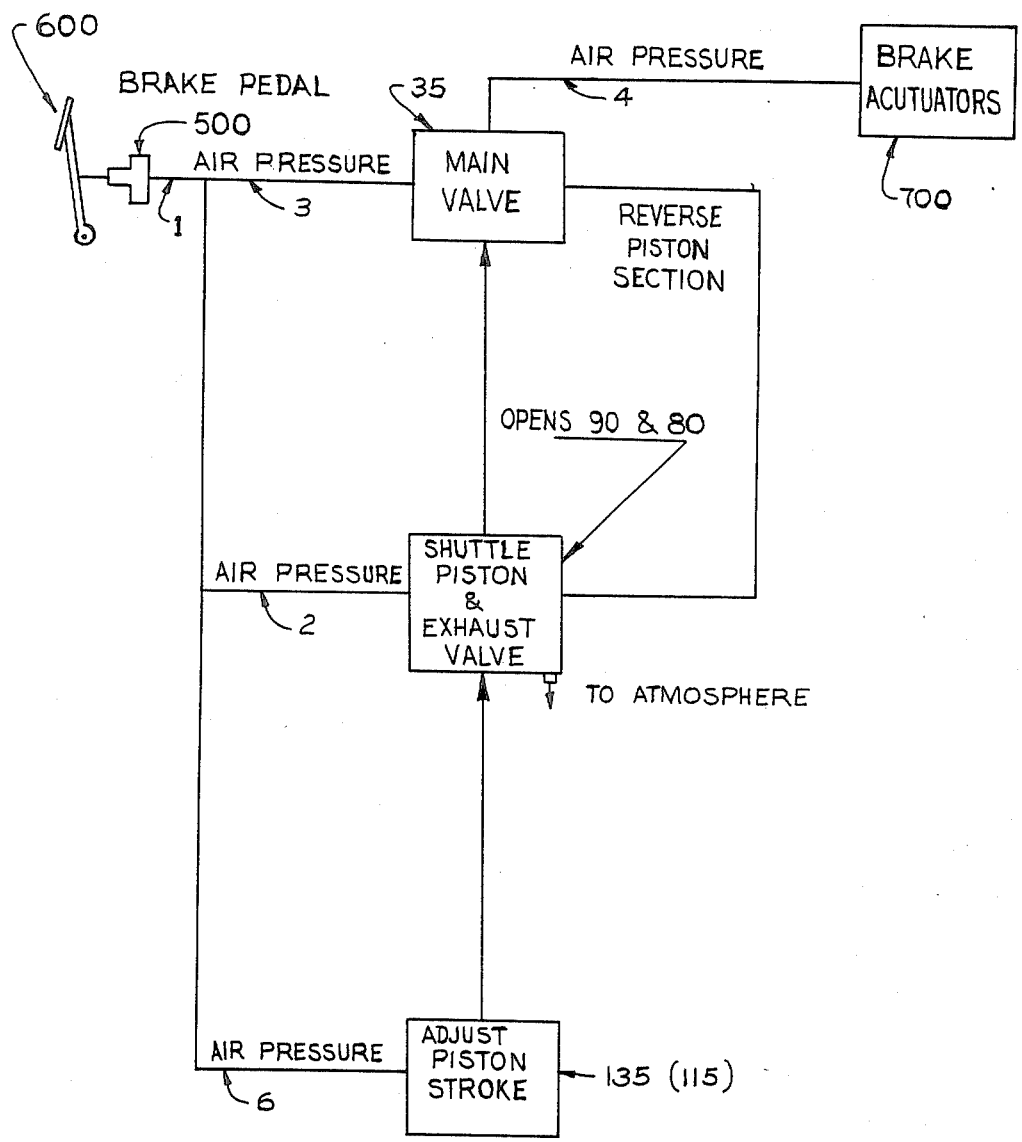

FIG. 1 is an overall drawing of the intermittent braking apparatus in the absence of braking action; and, FIG. 2 shows the control valving in a position of applied brakes.

PREFERRED EMBODIMENT OF THE INVENTION

The present invention is a device to be installed in the existing air pressure path extending between the conventional foot operated brake pedal, air pressure regulator valve and the brake shoe actuator cylinders. This arrangement provides a continuous air pressure path or it may initiate intermittent braking and change the frequency of intermittent braking. The preferred construction of this device comprises a housing of aluminum developed in portions to simplify in casting, molding or machining. These parts are bolted and sealed together using bolts and O-rings. The housing is cylindrical with the parts thereof concentrically secured together with a fluid path there through in a closed braking system.

FLOATING PISTON ASSEMBLY

In FIG. 1, valve 35 is normally closed due to spring 25 urging it to the righthand position shown. If the driver merely touches brake pedal 600, pressure from 200 p.s.i. tank 300 (maintained by compressor 200) causes air to flow through partly opened regulator valve 500 into conduit 1 and via conduit 2 into cylinder 170 behind piston 90 to move this piston in a left direction toward valve 35. Note here that the right-hand end of piston 90 is the smaller end because when equal pressure is applied on the larger and the smaller ends, piston 90 will move to the right due to the greater force effective over the larger area.

However, this is not the case upon the initiation of braking, because valve 35 is closed and the high pressure is not admitted to chamber 165 via conduit 3 at the present time.

When the piston 90 has moved sufficiently in the left-hand direction to cause valve 80 to strike the right-hand end 35 prime of valve 35, valve 80 is closed upon further movement of the piston 90 due to force in conduit 2. Piston 90 and valve 80 become a solid moving force and further pressure in conduit 2 provides a force to overcome spring 25 normally maintaining valve 35 closed and this action persists until main high pressure valve 35 is opened for high pressure application from conduit 3 into chamber 165 and thence via conduit 4 to brake actuators 700. The high pressure air in conduit 3 maintains the main line valve 35 open. Conduit 4 receives the high-pressure from chamber 165 via port 55 to activate the actuator 700.

It is important to note that the instant valve 35 was cracked, high pressure rushed into chamber 165 by instantly opening valve 35 fully and also by exerting force against the left-hand large end piston 90 to cause it to reverse its direction and travel to the right.

Actually under the conditions posed, with light to regular braking pressure, piston 90 is simply slammed back to the righthand position allowing the pressure from conduit 3 to maintain pressure in chamber 165 and at applicator 700.

When the brakes are applied hard, such as in an emergency, e.g. pressure exceeding 60 lbs. p.s.i., piston 135 is moved to the left due to the pressure effective over conduit 6 because the pressure is now strong enough to overcome spring 130. Plunger 115 is accordingly driven to the left thereby forcing plunger 80 to the left to open an exhaust passage for chamber 165 via exhaust conduit 155. Instantly the pressure in chamber 170 (FIG. 2) behind the small end of piston 90 as a result of conduit 2 causes the piston 90 to move to the left until plunger 80 strikes valve 35 terminal portion 35 prime which of course cracks valve 35 and lets high pressure from conduit 3 enter chamber 165 slamming open valve 35 and driving piston 90 to its right-hand position. So long as plunger 105 is protruding into chamber 170 sufficiently for impact by shuttle valve 80, the intermittent travel of piston 90 will continue to apply ON/OFF braking to acutaters 700. The harder the brake pedal 600 is depressed the greater the pressure in conduit 6 and the greater the displacement of plunger 115 and consequently the shorter the stroke of shuttle valve 80 and piston 90. In this way the apparatus is automatically regulating the frequency of the On/Off type braking to provide maximum anti-skid protection in the greatest of emergencies. It has been found that this type action will stop a truck on dry pavement even faster, perhaps requiring 7% less distance. It is, of course, much safer on mud, snow, ice or wet pavement. Thus, any time this type of braking is needed, the brake pedal is simply depressed harder, which is a normal reaction! This avoids jack-knifing, even permits stops on curves and the like.

PREFERRED CONSTRUCTION

A working model for handling a heavy-duty pickup with air brakes on the road today may comprise of:

The multi-part housing (20, 65, 75 and 125) of high grade aluminum and steel parts which may be 2½ inches in diameter and may have a length of 11¾ inches.

The valve 35 adjustment screw 5 is a ½ inch N.F. thread allen bolt 1¼ inches long with lock nut 10 (FIG. 1).

The valve 35 back-up body 20 is 2 inches in diameter 1¼ inches long of high grade aluminum which is center bored ⅝ inch diameter, ¾ inches deep and is threaded ½ inch N.F. for valve 35 adjustment screw 5 (FIG. 1).

The valve 35 body 65 (FIG. 1) may be 2½ inches in diameter, 2½ inches long, of high grade steel, drilled thru ½ inch diameter on center, counter bored ⅝ inch diameter 2 inches in depth with a 60 degree ground seat. The counter bore is to be finished for sliding and sealing. On a lathe, a one inch diameter cavity starting 1¼ inches from the valve 35 back-up body 20 end to a distance of 1 15/16 inches is formed. Drill thru to the cavity at a dimension of 1½ inches from valve 35 back-up body 20 end and tap a ½ inch tapered pipe thread.

On the cylinder 160 (FIG. 2) side of the valve 35 body 65, face the diameter suitable for O-ring 60 sealing. Face out a 1⅜ inch diameter ¼ inch deep, with a radiused tool cut 5/16 inch wide cut along the 1⅜ inch diameter to a depth of one inch from the O-ring 60 face to form chamber 165 (FIG. 2). Along the outer diameter ¼ inch from O-ring face, opposite the inlet port, drill and tap a ½ inch tapered pipe thread port 45 (FIG. 1).

Valve 35 (FIG. 1) is of high grade steel ⅝ inch diameter fitted to the valve body 65 (FIG. 1), finished for sliding and sealing with a hardened ground 60 degree seat 70 (FIG. 1) for a length of 1¼ inches and then reduced to ¼ inch diameter for the remaining ¼ inch.

Cylinder 75 (FIG. 1) is high grade aluminum 2½ inches in diameter and 4 inches in length. Face the 2½ inch diameter end, cut a 1¾ inch diameter O-ring groove for O-ring 60, and finish for sealing. Bore 160 (FIG. 2) 1½ inch diameter 1½ inches deep finish for sliding in the center of the 2½ inch diameter 1⅛ inches deep finish for sliding. Drill thru a 3/16 inch diameter for the plunger 115 (FIG. 1) in cylinder 75, and finish for sliding. Counter bore 105 (FIG. 1) a ½ inch diameter 1/16 inch deep for the head of plunger 115. Along side 2 9/16 inches from the O-ring finished surface, drill a 5/16 inch port 120 (FIG. 1) into the back-end of the one inch diameter cylinder, tap for a ¼ inch tapered pipe thread. Drill eight 3/16 inch diameter exhaust ports 155 (FIG. 1) equally spaced around 1⅜ inches from the O-ring 60 finished end (FIG. 1). Two of the exhaust ports 155 are shown exhausting cylinder 75 to the atmosphere. Turn a 1¾ inch diameter ¼ inch deep centering boss 180 (FIG. 1) on opposite end from the finished O-ring end.

The plunger 115 (FIG. 1) is hardened high grade steel ⅜ inch diameter 5/32 inch in length on the large end 3/16 inch diameter for the remaining 1 27/32 inch finished for sliding.

Piston 90 (FIG. 1) is nylon or other plastic 1½ inch diameter finished for sliding and O-ring sealing for a length of ¼ inch with an O-ring groove centered in the ¼ inch dimension. The smaller end of the piston 90 (FIG. 1) is one inch diameter and one inch long. An O-ring groove is 5/32 inch from small end. Finish the small diameter of the piston 135 for sliding and sealing. Face the end of the large diameter of the piston 90 suitable for sealing. Counter bore the smaller end of piston 90, ½ inch diameter ¼ inch deep. Drill thru 3/16 inch diameter suitable for valve 80 (FIG. 1) stem to slide. On the large end counter bore a ⅝ inch diameter 5/16 inch deep. Angle drill 8 ports equally spaced around the piston 90, 3/16 inch diameter exhaust ports 85 (FIG. 1) on 45 degree angle just behind and tangent to the large 1½ inch diameter in the small diameter of piston one inch into the ⅝ inch diameter counter bore.

Valve 80 (FIG. 1) is a high grade steel valve with valve flange 80' being ¾ inch diameter, and valve 80 being 2 5/16 inches long on the large diameter, faced suitable as flange 80' for sealing against piston 90 (FIG. 1). A ¼ inch diameter ⅞ inches long chambered edge boss protrudes into the large diameter of cylinder 160 (FIG. 2). A 3/16 inch diameter shaft 1 11/32 inch length finished for sliding in piston 90. A retainer ring ⅜ inch diameter placed 1/16 inch from the end retains valve 80 in piston 90 (FIG. 1).

Cylinder 125 (FIG. 1) is high grade aluminum 2½ inch diameter, 3¾ inches in length. A 1¾ inch diameter counter bore ¼ inch deep slip fitted to cylinder 75 (FIG. 1). A 1½ inch bore 1⅞ inches deep forms cavity for spring 130 (FIG. 1). The third bore one inch in diameter 1⅜ inches deep finished for sliding and sealing with an O-ring groove ⅛ inch just inside for sealing piston 135. Drill and tap on center line port 140 (FIG. 1) ¼ inch tapered pipe thread. Turn a 1½ inch diameter 1½ inches long on the outside of piston 135 (FIG. 1) end.

Piston 135 (FIG. 1) is high grade aluminum, 7/8 inch diameter, 7/8 inch in length in its largest portion. A 1/2 inch diameter one inch long projects into spring 130 (FIG. 1). A one inch diameter, 1 1/8 inches in length finished suitable for sliding and sealing forms the pressure side of piston 135 (FIG. 1).

Spring 25 is 1/2 inch diameter, 1 3/8 inches in length light duty (e.g.) one pound tension spring.

Spring 130 (FIG. 1) medium-high pressure maximum deflection of 37%, load of 66 lbs. and a hole diameter of 5/8 inch and length of 1 1/2 inches.

When conduit 4 is 1/2 inch in diameter, restricted air passage 119 is 0.050 inches in diameter. In order to allow time for the air in chamber 165 to exhaust via flange valve 80' and the eight passages 155, it is necessary to so restrict air flow into chamber 170. For air to escape chamber 165, it is necessary for:

1. Valve 35 to be closed, sealing off high pressure input air
2. valve flange 80' to be open
3. restriction 119 to be sized to permit exhaust before piston 90 completes its forward stroke because air pressure behind piston 90 is effective on the end 95 of valve 80 to maintain this exhaust valve open until its forward end strikes valve 35 end 35' to close valve 80. This insures complete release of the brakes before re-application thereof.

Finally, it should be noted that plunger 115 stops exhaust valve 80 by abutment therewith, but piston 90 also stops because once flange 80' is opened, the high pressure which was driving piston 90 and valve 80 is exhausted via passages 155. At approximately 60 p.s.i. in conduit 66 at control piston 135, plunger 115 is contacted and moved forward to abut exhaust valve 80 as pressure is pushing the piston 90 rearwardly to open flange valve 80' and then the urging pressure on the small end of piston 90 reverses its direction. Below 60 p.s.i., conventional braking obtains and pressures above 60 p.s.i. simply increase the frequency of intermittency when it is urgently needed.

Assemble cylinder 125 to cylinder 75 with four 1/4-24 N.F. machine screws 2 1/2 inches long equally spaced on a 2 inch diameter hole pattern. Drill clearance holes in cylinder 125 and tap cylinder 75 (FIG. 1).

Attach valve body 65 (FIG. 1) to cylinder 75 (FIG. 1) with four 1/4-24 allen screws 3 inches long on a 2 inch bolt circle equally spaced with special attention to avoid the inlet/outlet ports 155 (FIG. 1). Counter bore 3/8 inch diameter 1/2 inch deep to recess allen bolt heads in the valve body 65 (FIG. 1). Drill thru the valve body 65 and tap cylinder 75 (FIG. 1). Index valve body 65 to cylinder 75 on the 2 inch bolt circle in-between the bolts and directly adjacent install two 3/16 inch diameter, 5/8 inch in length metal blind dowells.

Install the valve back-up body 20 (FIG. 1) to the valve body 65 (FIG. 1) with four 3/16 inch N.F. machine screws 1 3/4 inches in length on a 1 1/2 inch bolt circle equally spaced. Drill through valve back-up body 20 and tap the valve body 65 (FIG. 1).

What is claimed is:

1. A vehicular intermittent braking apparatus for location in the main pneumatic line extending from the brake pedal actuated pressure regulator valve to the brake shoe actuators, and operable in accordance with the amount of force applied to the vehicular brake pedal, comprising in combination:

Normally closed main valve means for interrupting air flow through said line;

Shuttle piston and exhaust valve means urged in the direction of said main valve means by line air pressure whenever said brake pedal is depressed to crack said normally closed main valve means by contact therewith and permit line air pressure admitted through said main valve means to fully open the main valve means and reverse the direction of said shuttle piston and exhaust means, the end of the shuttle piston and exhaust valve means adjacent the main valve means being larger than the end of the shuttle piston and exhaust valve means remote from said main valve means to permit the admitted line air pressure to overcome the urging;

said main valve means closing as said contact is terminated;

said exhaust valve means effective at the end of the shuttle piston and exhaust means return stroke to exhaust said main line air effective at the actuators and the admitted air causing the shuttle piston and valve means to return whereby the shuttle piston and valve means is again caused to move in the direction of said main valve means due to said urging for further recipical motion.

2. The apparatus of claim 1, wherein:

The line air pressure urging the shuttle piston and exhaust means in the direction of the main valve means is delivered to the shuttle piston and exhaust means through a conduit having a capacity for air flow of approximately ten percent of that of the main line extending to the brake actuators, thereby insuring full release of the brake actuators upon any release thereof.

3. The apparatus of claim 2, further comprising:

means for limiting the stroke of travel of the shuttle piston and valve means to increase the frequency of intermittent braking.

4. The apparatus of claim 3, comprising:

means responsive to the magnitude of the pressure introduced into the main line by brake force applied to the pressure regulator to control said means for limiting the stroke.

5. The apparatus of claim 4 wherein:

the means responsive to the pressure magnitude comprises a resiliently biased piston subjected to said air pressure and movable as the resilience is overcome; and, said means for limiting the stroke comprises a plunger responsive to movement of said resiliently biased piston to establish limits for the exhaust valve means on the return stroke, thereby opening the exhaust valve means after shorter stroke travel to reverse the direction of movement of the shuttle piston and valve means sooner to increase the intermittent frequency as harder force is applied to the brake pedal.

6. A vehicular intermittent braking apparatus for location in the main pneumatic line extending from the brake pedal actuated pressure regulator valve to the brake shoe actuators and operable in accordance with the amount of force applied to the vehicular brake pedal, comprising in combination:

a vehicular carried housing connected in said line;

a main line high pressure valve in the housing to interrupt air flow from the pressure regulator valve to the actuators when closed, said high pressure valve being normally biased closed;

said housing including a large cylinder and a small cylinder adjacent to one end of the large cylinder and a compartment adjacent to the other end of the large cylinder;

a shuttle piston having a large diameter portion slidable in the large cylinder and a small diameter portion slidable in the small cylinder;

an air connection from the regulator valve side of the main line to the small cylinder for high pressure air effective against the small end of the shuttle piston portion remote from the large end thereof to apply high presure air whenever the brake pedal is depressed and moves the shuttle piston toward the high pressure valve when it is closed;

a shuttle exhaust valve carried by and movable relative to the shuttle piston for exhausting said compartment, large cylinder and main line from the housing to the actuators when the high pressure valve is closed;

the direction of travel of said shuttle piston and shuttle valve being reversed when said shuttle valve strikes the high pressure valve to crack it permitting high pressure air to apply force to the large end of the shuttle piston which overcomes the high pressure air applied against the smaller end of the shuttle piston; and, means responsive to the amount of force applied to said pedal to control the frequency of reciprocating movement of the shuttle valve and shuttle piston.

7. The apparatus of claim 6, wherein:

said air connection has a diameter approximately ten percent of the diameter of the main air line extending to the actuators.

8. The apparatus of claim 7, wherein:

said means responsive to the amount of force applied to said brake pedal comprises a control cylinder in said housing;

a control piston in said control cylinder;

resilient means biasing the control piston in one direction;

a connection from the main line to said control cylinder for applying main line pressure against said control piston to change its position in response to air pressure changes proportional to brake pedal pressure; and, a plunger extending between said control piston and the shuttle exhaust valve to limit its reverse motion turn around point, thereby shortening its stroke and increasing the intermittent frequency in response to increasing foot pedal force.

9. The apparatus of claim 8, wherein:

said shuttle exhaust valve comprises a rod slidable through said shuttle piston and a flange on the rod for opening and closing the compartment to atmosphere, one end of said rod comprising a portion of the shuttle piston small end portion which receives high pressure air thereby insuring movement of the shuttle exhaust valve with the shuttle piston in the direction of the high pressure valve, said flange comprising part of the shuttle piston large diameter portion facing the main high pressure valve to insure movement of the shuttle valve with the shuttle piston in the reverse direction.

* * * * *